Dec. 10, 1957 E. HOLT 2,815,775
BAND SAW
Filed Jan. 14, 1954 2 Sheets-Sheet 1
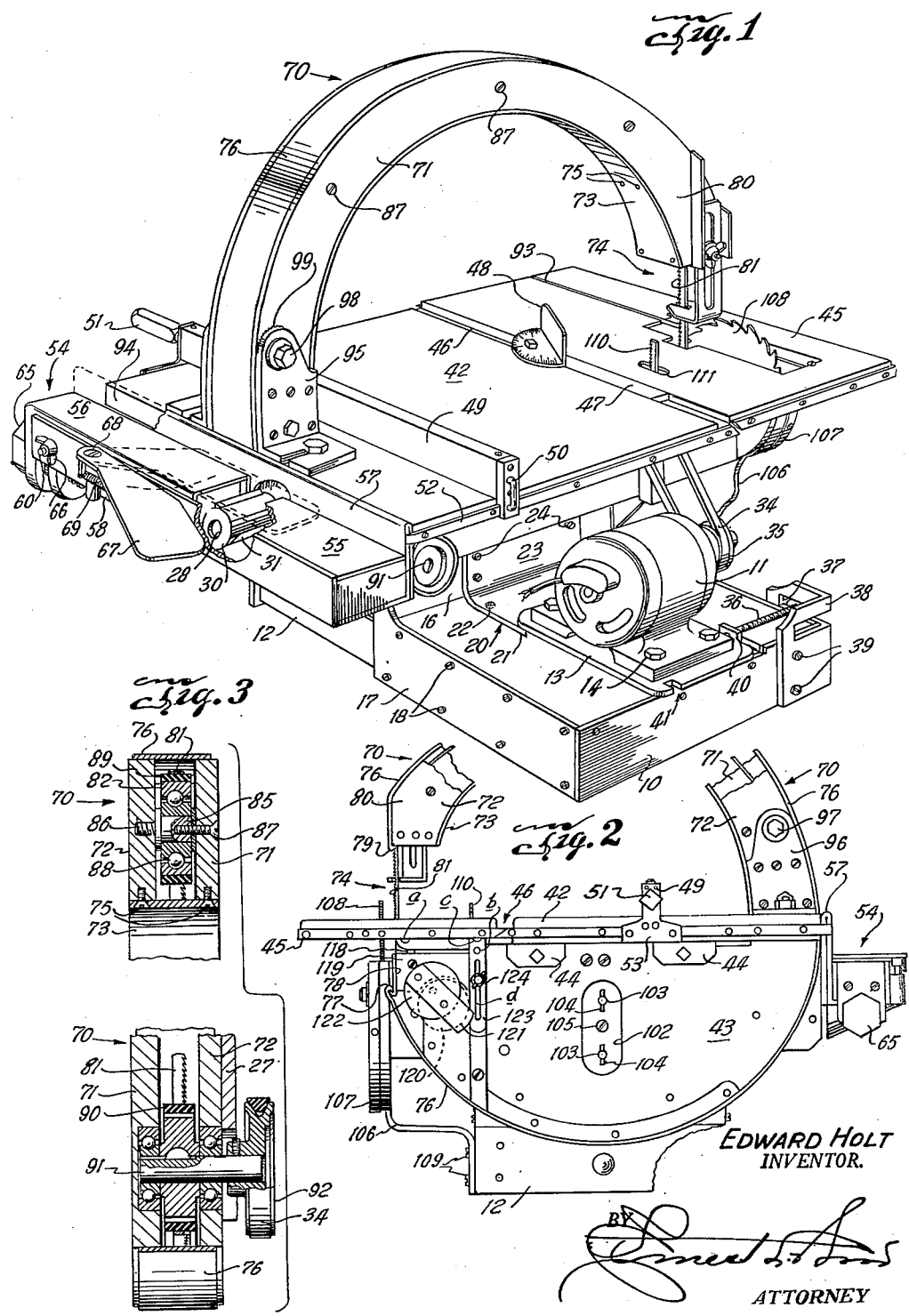
EDWARD HOLT
INVENTOR.
ATTORNEY Dec. 10, 1957
E. HOLT
2,815,775
BAND SAW
Filed Jan. 14, 1954
2 Sheets-Sheet 2
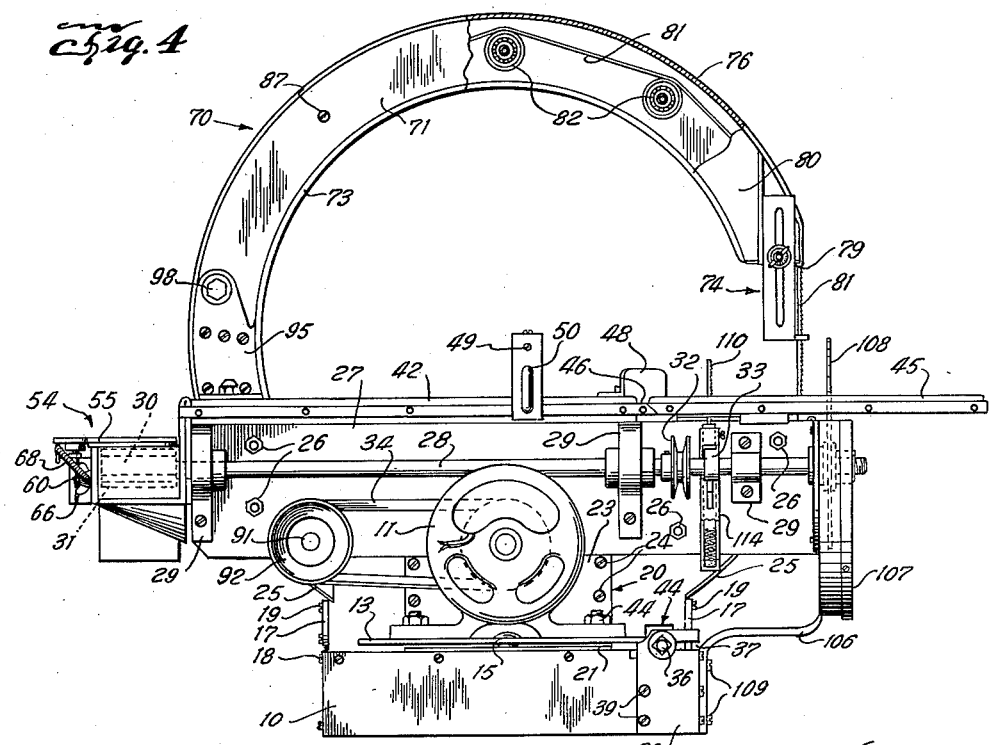
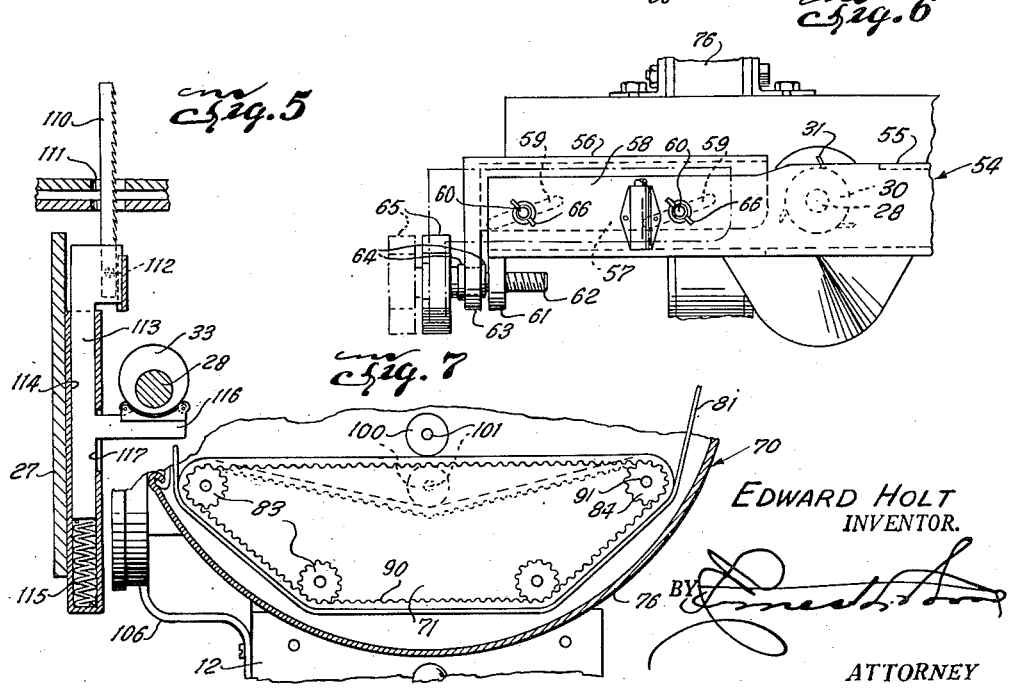
EDWARD HOLT
INVENTOR.
ATTORNEY

United States Patent Office 2,815,775
Patented Dec. 10, 1957

2,815,775

BAND SAW

Edward Holt, Dallas, Tex.

Application January 14, 1954, Serial No. 404,051

3 Claims. (Cl. 143—24)

This invention relates to woodworking equipment and more particularly to a combination sawing and joining machine.

The principal object of the invention is to provide a light and readily portable machine for general woodworking purposes which is especially attractive to operators of home work shops in view of its high degree of flexibility in its speedy adaptation to various types of work and its safety characteristics, although its compact and sturdy construction renders the machine equally as useful and effective in industrial application.

Another object of the invention is to provide a machine possessing the attributes of a circular saw, band saw, saber saw and joiner in compact assembly, all being operated from a common shaft driven by a single motor, requiring but simple adjustments to effect individual function of the elements.

Other objects will appear as the description proceeds, when considered with the annexed drawings, wherein:

Figure 1 is a rear perspective view of a machine constructed according to the invention.

Figure 2 is a side elevational view of the machine on a reduced scale, with parts broken away.

Figure 3 is a vertical sectional view, partly broken away, showing the rotary mounting and driving means for the band saw.

Figure 4 is an elevational view of the side of the machine opposite that shown in Figure 2.

Figure 5 is a fragmentary detail view in section showing the saber saw and driving means therefor.

Figure 6 is a fragmentary detail view of the joiner showing height adjustment of the work support thereof, and Figure 7 is a fragmentary view of the rotary band saw mounting showing the means for driving the same.

Continuing with a more detailed description of the drawing, reference numeral 10 denotes a base on which is supported the single operating motor 11. Within the base is slidably arranged a utility drawer 12. The motor 11 is mounted on a plate 13 and is secured thereto by means of bolts 14 and by referring to Figure 4, it will be observed that the plate 13 is connected to the base 10 by means of a single center bolt 15 so that the plate and motor may rotate on the base about the pivot afforded by the bolt 15. The purpose of this will be made clear in the course of the following description.

The base 10 is secured to a vertical plate 16 by means of side plates 17, one on each side of the base 10 and secured thereto by screws 18. The side plates 17 are secured to the ends of the vertical plate 16 by screws 19. In addition to the side plates 17, the base is further secured to the vertical plate 16 by means of an L-shaped bracket 20, the horizontal leg 21 of which is secured to the top of base 10 by screws or bolts 22 while the vertical leg 23 of the bracket is secured to the vertical plate 16 by screws 24.

The vertical plate 16 extends upwardly and is formed with a laterally extending portion 25 on each side thereof (Figure 4), to which is secured, by means of four bolts 26, a horizontal plate 27 which latter serves as a mounting for the common or main drive shaft 28 for all of the working elements of the machine. By removing the four bolts 26, all of the described elements, that is, the base, motor, plate 16 and bracket 20 may be detached from the remainder of the machine frame as a unit.

The main shaft 28 is journaled in three spaced apart bearings 29, which bearings are secured, as by bolting, to the horizontal plate 27. The rear end of the shaft extends beyond the rearmost bearing 29 and carries a rotary cutting head 30 in which is mounted a series of radial cutters 31. Between the two companion bearings 29, which are disposed nearer the front of the machine, the shaft 28 carries a drive pulley 32 and a cam 33 (Figures 4 and 5). When the motor 11 is rotated to the position shown in Figure 1, a belt 34 is passed around a pulley 35 on the motor shaft and the pulley 32 on the main shaft 28, thereby driving the latter. In order to maintain tension on the belt 34, a belt tightener is provided, consisting of bolt 36 which extends through a slot 37 in an L-shaped bracket 38 affixed by screws 39 to one corner of the base 10. The bolt 36 has a rotatable head 40 which, when the motor is in the position shown in Figure 1, engages against the side of the plate 13 on which the motor is mounted and imposes a force thereon opposite that exerted by the belt 34 and by rotating the bolt 36, tension on the belt is increased or decreased, as desired. On the other hand, when the motor 11 is positioned as shown in Figure 4, the motor mounting plate 13 will have been rotated 90° and a slot 41 (Figure 1) in one end of this plate will lie opposite the bolt 36 so that its head 40 will engage in the slot 41. In this position, the bolt 36 will extend through the slot 37 in the other leg of the corner bracket 38 and rotation of the bolt will produce the same result, that is, it will adjust the tension on the belt 34.

The work table of the machine is made up of a stationary section 42 which is secured to the side plate 43 opposite the vertical plate 16, previously referred to, by means of brackets 44 (Figure 2). Normally in the same plane with the stationary work table section 42, but adjustable independently thereof is a movable section 45 to which further reference will be made presently. Defined between the confronting edges of the stationary table section 42 and the movable section 45 is a groove 46 in which is slidably disposed the mounting bar 47 of an adjustable miter gauge 48 and, adjutable longitudinally on the table section 42 is a transverse work retainer fence 49. A rod 50 extends longitudinally through the fence and has an operating handle 51 on one end and at its opposite end, the rod is turned downwardly and inwardly to bear against a rail 52 affixed to the edge of the table 42. By rotating the handle 51, the end of the rod is extended or retracted, clamping the opposite edges of the table between the end of the rod on one side and a plate 53 (Figure 2) on the opposite side, thus holding the fence in adjusted positions.

At the rear of the stationary work table 42 is affixed a joiner 54, consisting of a stationary work support 55 and a movable work support 56. A fence 57 is disposed at one side of and perpendicular to the plane of the work supports 55 and 56. Intermediate the supports 55 and 56 is mounted the cutting head 30 on the end of the main shaft 28. Adjustability of the movable support 56 is accomplished in the manner shown in Figure 6. The support 55 has a bar 57 affixed longitudinally to its undersurface and is slidable between the vertical parallel plates 58 of the joiner. A pair of oblique slots 59 are formed in the bar 57 in longitudinally spaced apart relationship and through each of these slots extends a bolt 60, the bolts being stationary with the side plates 58. Depending from the ends of plates 58 is a lug 61 through which a bolt 62 is threaded. The bolt extends loosely through an opening in a lug 63 depending from the end of the plate 56 of the movable support but is held against other than rotatable movement in relation to this latter lug by washers 64, one affixed to the bolt 62 on each side of the lug 63. Thus, when the knob 65 on the outer end of the bolt 62 is rotated, the bar 57 and consequently the supporting plate 56 will be raised and lowered by virtue of the oblique slots 59 and bolts 60 as the bar is longitudinally moved. In this manner, the work on the joiner is raised and lowered in relation to the cutting head 30 to adjust the depth of the cut. The support 56 may be secured in adjusted positions by tightening the wing nuts 66 on the bolts 60.

As a safety measure, a plate 67 pivoted at 68 to the joiner frame (Figure 1) is held normally over the cutting head 30 by means of a coil spring 69. The work supported on the joiner being effective to hold the plate in displaced position but upon removal of the work, the spring 69 returns the plate to a position to cover the cutter head 30 to prevent injury to the hands or fingers of the operator.

Referring now to the band saw and its mounting, it will be observed that the band saw housing 70 is generally of circular form and consists of side members 71 and 72 on opposing sides of the housing. The lower portion of the housing is enclosed on one side by the plate 43, and on the opposite side by the plate 16, which, as stated, is detachable by the removal of the four bolts 26.

A circular band 73 encloses the inside of the band saw housing and extends from the work gap 74 of the housing to the opposite end of the latter below the stationary work table 42. The band is attached by screws 75 entering threaded holes in the inner peripheries of the side members 71 and 72 of the housing 70. An external band 76 has a hook 77 on one end (Figure 2) which engages a hook on a depending plate 78 at the front of the machine below the work gap 74. The band 76 continues entirely around the band saw housing 70 and its opposite end has a hook 79 which engages under the working head 80 of the housing.

The external band 76 is held in place simply by frictional engagement with the members 71 and 72 of the frame or housing 70 and may be slipped off the frame when it becomes necessary to remove or replace the band saw.

The band saw 81 is mounted on a plurality of annularly spaced rollers 82 within the upper half of the housing 70 and the series of rollers 83 and 84 (Figure 7) in the lower portion of the housing. In Figure 3 is shown one of the rollers 82, each of which has a stationary hub 85, made so by a threaded stud 86 entering a threaded bore in the inner wall of the side member 71 of the housing 70 and a screw 87 which threadedly enters the opposite end of the hub 85. This arrangement enables the side 71 of the housing 70 to be removed without disturbing the rollers 82, by removing the screws 87.

Each of the rollers 82 is composed of two concentric parts constituting the inner and outer races for ball bearings 88 (Figure 3). The rollers 82 each has a rubber tread 89 but the rollers 83 and 84, shown in Figure 7, are toothed or ribbed, as shown, to conform to the ribbed inner surface of a drive belt 90 which surrounds the four rollers 83 and the driving roller 84. The band saw 81 passes under the series of driving rollers 83 and 84 on the outer surface of the drive belt 90 and in this manner the band saw is driven.

To impart motion to the driving roller 84 and the drive belt 90, the shaft 91 on which the roller 84 is mounted extends laterally through an opening in the side member 71 of the housing 70 and a recess in the plate 27, as shown in Figure 3, and carries on its opposite end a pulley 92. When the driving motor 11 is positioned as shown in Figure 4, the belt 34 thereof will engage the pulley 92 and will impart rotation to the annular assembly of rollers 82, 83 and 84 and will thereby drive the band saw 81.

When it becomes necessary to remove the band saw 81, the external band 76 is slipped off the housing 70 from the side thereof shown in Figure 2. A slot 93 is made from the center of the movable work table 48 outward to the edge thereof (Figure 1) and a slot 94, parallel with slot 93 is made in the stationary work table 42 to accommodate the band saw when it is removed. It is necessary, in removing the band saw, to relieve tension thereon. This is made possible by pivoting the head or upper portion of the band saw housing 70 to brackets 95 and 96 on opposite sides of the housing opposite the work gap 74, by means of bolts 97 and 98 (Figures 1 and 2). By loosening these bolts, the head drops down to permit the band saw to be removed from its roller mounting. The head is held in raised position both by the clamping action of the bolts 97 and 98 and the knurled face 99 (Figure 1) between the confronting faces of the brackets 95 and 96 and the surfaces of the side members 71 and 72.

To tension the drive belt 90 of the band saw, an idler roller 100 (Figure 7) bears against the upper lead of the belt and is mounted on a stub shaft 101. By referring to Figure 2 it will be seen that an oblong plate 102 is attached to the side plate 43 of the housing 70 by screws 103 entering vertical slots 104 in the plate. A center screw 105 enters the end of the shaft 101 of the idler roller 100 and supports the same. By loosening the screws 103, the plate 102 may be raised or lowered and with it the roller 100 to increase or decrease the tension on the drive belt 90.

Mounted on an S-shaped bracket 106 at the forward end of the machine is a circular saw guard 107 in which operates the circular saw 108 which is mounted on the forward end of the main shaft 28. The lower end of the S-shaped bracket 106 is secured to the base 10 by bolts 109. This saw is removed when it is desired to use the band saw or a saber saw 110.

The saber saw 110 may be better seen in Figure 5 in which it is shown extending upwardly through an opening 111 in the tiltable section 45 of the work table. The lower end of the saber saw 110 is detachably connected at 112 to the upper end of a square plunger 113, reciprocably mounted in a square sleeve 114, affixed to the horizontal plate 27. A coil spring 115 bearing at one end against the bottom of sleeve 114 and at its opposite end against the lower end of the plunger 113 holds the latter normally in raised position. Biasing the action of the spring 115 is the cam 33, previously referred to as being mounted on the main shaft 28. This cam is in continuous engagement with a lateral arm 116 on the plunger 113 which extends through a slot 117 in the front wall of the sleeve 114. It is evident from the foregoing that when the shaft 28 is rotated, the cam 33 will operate against the arm 116 of the plunger 113, oscillating the same and the saber saw 110.

To change the angular position of the movable section 45 of the work table, reference is made to Figure 2 wherein the section 45 is shown as being pivoted at *a* to the top of a vertically movable plate 118. The table section 45 is held against tilting displacement by a set screw *b* . The mounting plate 118 is slidable vertically in a guide 119 within which is an eccentrically pivoted disc 120. This disc engages under the lower edge of the mounting plate 118 within the guide 119 and is rotated by means of a handle 121 which is attached to an external disc 122 to which the internal disc cam 120 is fixed in eccentric relationship so that when the handle 121 is oscillated the outer disc 122 will be rotated to actuate the disc cam 120 to thereby raise and lower the table mounting plate 118 within its guide 119. A supporting arm 123 is pivoted at *c* to the underside of the table section 45 and moves with the latter. The arm 123 has a longitudinal slot $d$ therein through which extends a screw 124 as a means for securing the table in adjusted raised position as well as in any desired tilted position of the table.

The foregoing description includes sufficient explanation of the operation of the machine to enable those skilled in the art to understand the function of all of the parts as well as the machine as a whole. It is evident that to operate one of the saws 108 or 110, the other must be removed. It is not necessary, however, that the joiner cutter be removed to operate any of the saws since it remains well covered by the safety plate 67. For safety reasons, it is desirable that both saws 108 and 110 be removed before operating the joiner. In any case, the only requirement in changing from the saws 108 and 110 and joiner 54 to the band saw is to remove the belt 34 from the pulley 32 on the main shaft 28, rotate the motor 11 90° and replace the belt 34 on the pulley 92 which drives the band saw.

Manifestly, the construction as shown and described is capable of some modification and such modification as may be construed to fall within the scope and meaning of the appended claims is also considered to be within the spirit and intent of the invention.

What is claimed is:

1. In a woodworking machine, the combination comprising a base, a housing on said base defining a true circle, the upper half of which is open and provided with a work gap, a plurality of annularly spaced rollers in the closed lower half of said housing, a band saw engaging said rollers, a drive belt embracing a group of the rollers in the lower half of said housing, a horizontal work supporting table traversing said housing at its midsection, said work table having a stationary section and a tiltable section traversing said work gap of said housing, a stationary plate closing one side of the lower half of said housing below said work table, a removable plate on the side of said housing, opposite said stationary plate, a motor mounted on said base, means pivotally connecting the upper half of said circular housing to the lower half thereof opposite said work gap for the removal and replacement of said band saw on said rollers and means for connecting said motor and said roller-drive belt to operate said band saw.

2. A wood working machine comprising a base, a housing in the form of a true circle disposed in a vertical plane and having a work gap, said housing having an open upper portion and a closed lower portion, a sectional and slotted work table bisecting said housing above the closed portion of said housing, means supporting the portion of said housing above said work table opposite said work gap for tilting displacement, a plurality of annularly spaced rollers in said housing carrying a band saw whose removal and replacement is effected through the slots in said work table, a removable band encircling the outer perimeter of said housing to close the same, means securing the opposed ends of said band to said housing at points above and below said work gap, a belt embracing a predetermined number of said rollers for driving said band saw, a motor rotatably mounted on said base and means effecting connection between said motor and one of said belt embraced rollers for driving said belt.

3. The structure of claim 2, a vertically movable plate supporting a first section of the work table adjacent the work gap of the housing, an eccentrically pivoted disc engaging the bottom edge of the plate, a handle for rotating the disc to effect vertical displacement of the first section in relation to the companion section of the work table, and means for locking the first section in selectively elevated and tilted positions.

References Cited in the file of this patent

UNITED STATES PATENTS

| | | |
|---|---|---|
| 1,617,211 | Hutchinson | Feb. 8, 1927 |
| 1,834,684 | Dannehower | Dec. 1, 1931 |
| 1,866,395 | Campbell | July 5, 1932 |
| 1,973,409 | Evinrude | Sept. 11, 1934 |
| 2,045,853 | Hertz | June 30, 1936 |
| 2,080,475 | Hedgpeth | May 18, 1937 |
| 2,274,923 | Hedgpeth | Mar. 3, 1942 |
| 2,579,955 | Orescan | Dec. 25, 1951 |